(12) United States Patent
Roeygaard et al.

(10) Patent No.: US 12,462,236 B2
(45) Date of Patent: Nov. 4, 2025

(54) LOTTERY TICKET DATA INTERCEPTOR FOR A POINT-OF-SALE SYSTEM

(71) Applicant: Brightstar Global Solutions Corporation, Providence, RI (US)

(72) Inventors: Michael Roeygaard, Rome (IT); Apostolos D. Kallis, Barrington, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 135 days.

(21) Appl. No.: 17/930,601

(22) Filed: Sep. 8, 2022

(65) Prior Publication Data

US 2024/0086882 A1    Mar. 14, 2024

(51) Int. Cl.
*G06Q 20/20* (2012.01)
*G07F 17/32* (2006.01)
*G07G 1/00* (2006.01)

(52) U.S. Cl.
CPC ........... *G06Q 20/20* (2013.01); *G07F 17/329* (2013.01); *G07G 1/0045* (2013.01)

(58) Field of Classification Search
CPC ..... G06Q 20/20; G07F 17/329; G07G 1/0045
See application file for complete search history.

(56) References Cited

U.S. PATENT DOCUMENTS

| | | | |
|---|---|---|---|
| 5,216,595 A | 6/1993 | Protheroe | |
| 5,239,165 A * | 8/1993 | Novak | G07F 17/32 235/383 |
| 6,267,670 B1 | 7/2001 | Walker et al. | |
| 6,887,153 B2 | 5/2005 | Walker et al. | |
| 6,899,621 B2 | 5/2005 | Behm et al. | |
| 7,100,822 B2 | 9/2006 | Piper et al. | |
| 7,479,060 B2 | 1/2009 | Walker et al. | |
| 7,547,251 B2 | 6/2009 | Walker et al. | |
| 7,627,497 B2 | 12/2009 | Szrek et al. | |
| 7,756,742 B2 | 7/2010 | Gilmore et al. | |
| 8,328,618 B2 | 12/2012 | Ekisheva et al. | |
| 10,229,466 B2 | 3/2019 | Christensen et al. | |
| 10,373,443 B2 | 8/2019 | Ghia | |
| 10,769,894 B2 | 9/2020 | Giunti | |
| 11,158,172 B2 | 10/2021 | Ghia | |
| 2003/0220132 A1 | 11/2003 | Walker et al. | |
| 2005/0233797 A1* | 10/2005 | Gilmore | G07F 17/42 463/17 |
| 2008/0026810 A1* | 1/2008 | Walker | G07F 17/3269 463/17 |
| 2009/0292600 A1 | 11/2009 | Davis | |
| 2012/0138688 A1 | 6/2012 | Young | |
| 2017/0018048 A1* | 1/2017 | Christensen | G06Q 50/34 |
| 2017/0323704 A1 | 11/2017 | Ovalle | |
| 2019/0073652 A1 | 3/2019 | Garrison | |
| 2019/0188947 A1* | 6/2019 | Giunti | G07F 17/329 |
| 2020/0043278 A1* | 2/2020 | Gotlieb | G06Q 50/34 |
| 2021/0065497 A1 | 3/2021 | Bettcher et al. | |

OTHER PUBLICATIONS

"Lottery Tracking System—LottoShield", www.lottoshield.com, available prior to Sep. 8, 2022.

\* cited by examiner

*Primary Examiner* — Fahd A Obeid
*Assistant Examiner* — Jessica E Sullivan

(57) ABSTRACT

A POS lottery ticket data interceptor for a point-of-sale system, and systems and methods employing such POS lottery ticket data interceptor with POS systems that enable the activation, purchase, validation, and/or redemption of lottery tickets through such POS systems.

19 Claims, 6 Drawing Sheets

LOTTERY TICKET DATA INTERCEPTOR FOR A POINT-OF-SALE SYSTEM

BACKGROUND

The present disclosure relates to a lottery ticket data interceptor for a point-of-sale ("POS") system that enables purchase and/or redemption of lottery tickets through the POS system.

Lottery tickets such as instant lottery tickets have substantial variations in the structures, configurations, and arrangements of the individual components of inventory control numbers and barcodes for such lottery tickets. These variations occur on a jurisdictional basis and on a manufacturer basis. This wide variety of the structures, configurations, and arrangements of the individual components of the inventory control numbers and barcodes for lottery tickets limits the types of systems that can be used to activate, sell, validate, and/or redeem such lottery tickets. For example, POS systems commercially employed by wholesalers and retailers are not configured to activate, sell, validate, or redeem lottery tickets.

BRIEF SUMMARY

In various embodiments, the present disclosure relates to a point-of-sale (POS) lottery ticket data interceptor configured to be communicatively and operably connected to a POS system scanner and a POS system terminal of a POS system. The POS lottery ticket data interceptor includes: a housing; a POS system scanner connector supported by the housing and communicatively connectable to the POS system scanner; a lottery terminal connector supported by the housing and communicatively connectable to the POS system terminal; a data transmitter supported by the housing; a data receiver supported by the housing; a processor supported by the housing and communicatively connected to the POS system scanner connector, the lottery terminal connector, the data transmitter, and the data receiver; and a memory device supported by the housing.

In various other embodiments, the present disclosure relates to a point-of-sale (POS) lottery ticket data interceptor configured to be communicatively and operably connected to a scanner and a POS system terminal of a POS system. The POS lottery ticket data interceptor includes: a housing; a scanner connector supported by the housing and connectable to the scanner; a lottery terminal connector supported by the housing and connectable to the POS system terminal; a data transmitter supported by the housing; a data receiver supported by the housing; a processor supported by the housing and communicatively connected to the m scanner connector, the lottery terminal connector, the data transmitter, and the data receiver; and a memory device supported by the housing. The memory device stores a plurality of instructions that when executed by the processor, cause the POS lottery ticket data interceptor to: analyze scan data received from the scanner, responsive to the scan data being lottery ticket related data related to a lottery ticket, transmit data based on the lottery ticket related data to a lottery central system, receive lottery ticket data from the lottery central system, and transmit data to the POS system terminal to facilitate purchase of the lottery ticket.

In various other embodiments, the present disclosure relates to a point-of-sale (POS) lottery ticket data interceptor configured to be communicatively and operably connected to a scanner and a POS system terminal of a POS system. The POS lottery ticket data interceptor includes: a housing; a scanner connector supported by the housing and connectable to the scanner; a lottery terminal connector supported by the housing and connectable to the POS system terminal; a data transmitter supported by the housing; a data receiver supported by the housing; a processor supported by the housing and communicatively connected to the scanner connector, the lottery terminal connector, the data transmitter, and the data receiver; and a memory device supported by the housing. The memory device stores a plurality of instructions that when executed by the processor, cause the POS lottery ticket data interceptor to: analyze scan data received from the scanner, responsive to the scan data being lottery ticket related data related to a lottery ticket, transmit data based on the lottery ticket related data to a lottery central system, receive lottery ticket data from the lottery central system, and transmit data to the POS system terminal to facilitate redemption of the lottery ticket.

Additional features are described in, and will be apparent from, the following Detailed Description and the figures.

DETAILED DESCRIPTION

Figure 1:
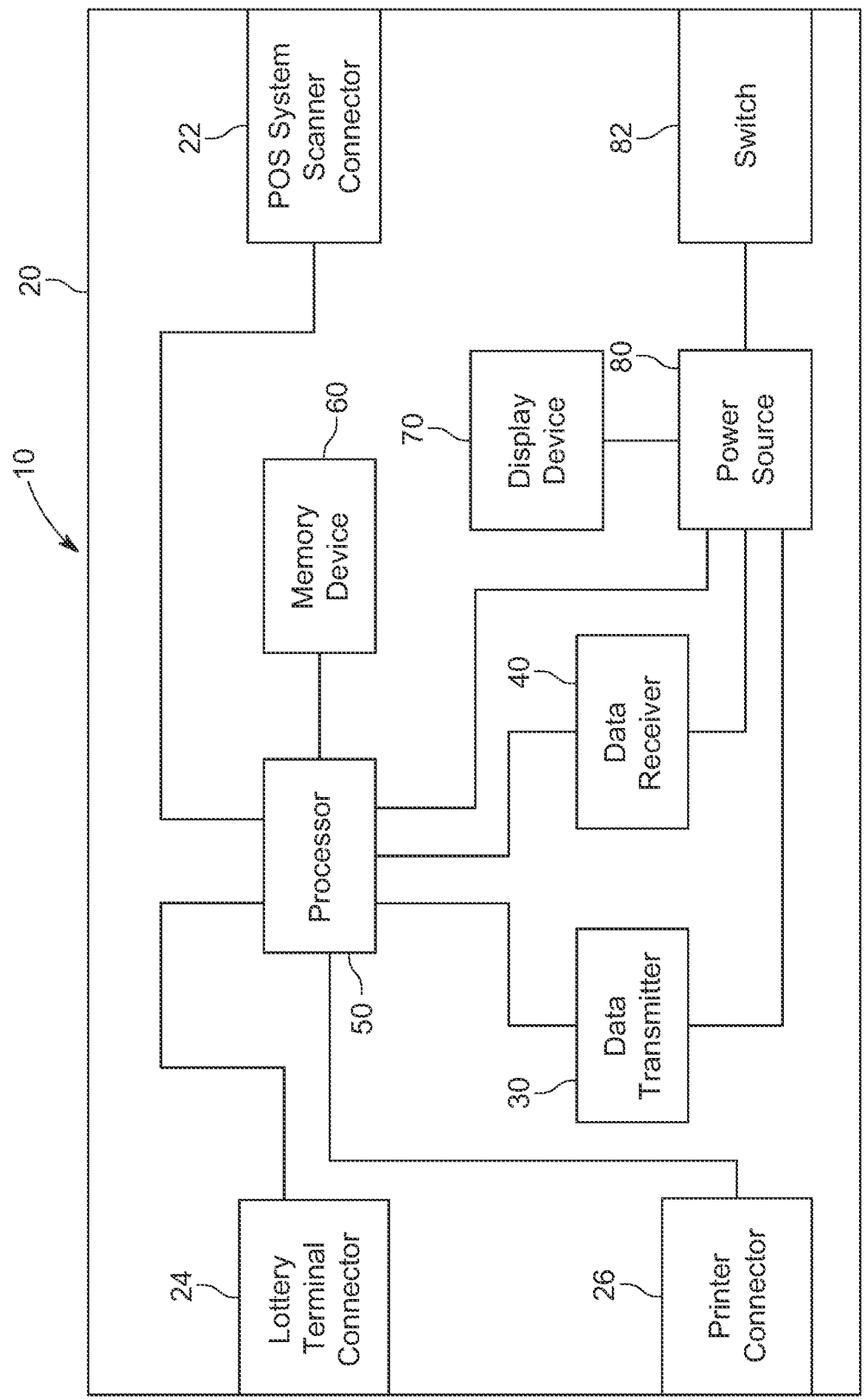
FIG. 1 is a diagrammatic view of a POS lottery ticket data interceptor of one example embodiment of the present disclosure.

In various embodiments, the present disclosure relates generally to a POS lottery ticket data interceptor for a point-of-sale system (referred to herein as a POS system), and systems and methods employing such POS lottery ticket data interceptor with POS systems that enable the activation, purchase, validation, and/or redemption of lottery tickets through such POS systems.

Instant lottery tickets and draw lottery tickets are employed as example lottery tickets herein; however, it should be appreciated that the present disclosure is not meant to be limited by such examples. For a better understanding of the present disclosure, example instant lottery tickets are first described herein.

Various known instant lottery tickets are single game instant lottery tickets. Example single game instant lottery ticket such as ticket T1 in FIG. 2 includes: (1) a ticket substrate (not labeled); (2) a front surface (not shown) of the ticket substrate; (3) a predefined scratch-off area (not shown)

defined on the front surface; (4) a scratch-off coating ("SOC") (not shown) covering variable lottery game indicia (not shown) printed on the predefined scratch-off area; (6) a back surface (not labeled) of the ticket substrate; and (7) variable instant lottery ticket information indicia (not labeled) printed on the back surface. The instant lottery ticket information indicia can include text, one or more ticket numbers, one or more ticket barcodes, and other instant lottery ticket information that is either or both human readable and machine readable. Certain of the instant lottery ticket information identifies the instant lottery ticket, the set, run, and/or pack of the instant lottery tickets that this instant lottery ticket is/was part of, and can provide other inventory control information. Various known instant lottery tickets include multiple predefined scratch-off areas, multiple sets of variable lottery game indicia printed on the predefined scratch-off areas, and multiple SOCs covering the variable lottery game indicia sets.

Known instant lottery tickets include a variable human readable inventory control number, associated machine-readable barcode, and legal text printed on the instant lottery ticket back. The inventory control number can include: (1) a three-digit game identifying number; (2) a six-digit pack number; (3) a one-digit check number; and (4) a three-digit ticket number, that together uniquely identify this instant lottery ticket from a pack of instant lottery tickets. The instant ticket's barcode can also represent corresponding identical data. All of this data in both machine and human readable formats specifically only provide limited information regarding the instant lottery ticket. The instant ticket inventory control data on the back of the instant lottery ticket are readable prior to purchase of the instant lottery ticket. This readability enables lottery system warehouse storage, picking, shipping, pack activation, purchase, and redemption of such instant lottery ticket. For security reasons, many lotteries have removed win or loss related information from this visible barcode and placed such information under scratch-off material.

The instant lottery ticket's barcode can be scanned by barcode reading devices but unless those devices are connected to a lottery's instant lottery ticket management system, the devices such as those connected to POS systems cannot process and use the information to enable purchase and/or redemption of such instant lottery tickets. This is in part due to the varying lengths of the inventory, validation, and check digit information, such information being non-uniform and varying from jurisdiction to jurisdiction, which collectively make it very difficult for POS systems to determine how to process and use this data. Additionally, certain lottery tickets have two separate barcodes that are geographically separated on the substrate of the ticket, and which have different barcode formats and encode different data.

Instant lottery tickets are often arranged during manufacture (which includes after complete printing) in instant lottery ticket packs of a static quantity that often varies by price point for storage, for organization, for sorting, for picking, and for shipping to instant lottery ticket sellers (such as instant lottery ticket retailers). The instant lottery ticket packs often include: (1) a stack of instant lottery tickets (that are all of the same type, same size, and same game(s)); and (2) a transparent secure outer wrapping (such as transparent plastic wrapping) around the stack of instant lottery tickets. Such instant lottery ticket packs are often configured such that the back surface of at least one instant lottery ticket is visible through the transparent pack wrapping. Logistical tracking and activation of such instant lottery tickets are accomplished by the grouping of tickets in these packs. There are several reasons for arranging instant lottery tickets in packs. One reason is that instant lottery tickets can be ordered and shipped in packs with the pack being the fundamental unit of reconciliation. Since instant lottery tickets are shipped in packs, the pack is also the fundamental unit of activation on the overall instant lottery ticket system. In other words, individual instant lottery ticket activation is currently done on the pack level instead of the individual ticket level. When a retailer receives a new pack of instant lottery tickets, the retailer must first activate the pack on the instant lottery ticket system before selling any of the instant lottery tickets in that pack. Pack activation thereby enables instant lottery tickets to be shipped via common carrier since un-activated or stolen instant lottery ticket packs can be flagged on the instant lottery ticket system with any instant lottery ticket in that pack designated as invalid if redemption of that instant lottery ticket is attempted.

All of the packs for a given lottery game are logged in a digital ship file by the instant lottery ticket manufacturer and loaded on the instant lottery ticket system prior to the tickets for that lottery game being placed on sale for purchase. The ship file contains a listing of all the manufactured packs identifying (typically by omission) any pack numbers that were destroyed in the manufacturing process. The inventory file for a game is transferred from the ticket manufacturer and loaded into a lottery's instant ticket management system. As a lottery game is placed on sale for purchase, the instant ticket system collects information such as: "pack 'X' shipped to retailer 'Y'", and then "pack 'X' was activated", or "pack 'X' was reported as stolen/missing", etc. Thus, the ship file enables logistical tracking of all manufactured packs for an instant lottery ticket game. The ship file does not contain any win or lose information and cannot be linked to a validation file.

The validation file contains the validation codes for all instant lottery tickets for a lottery game. The validation codes provide pointers to the prize values (if any) of the instant lottery tickets on the instant lottery ticket system. The validation codes are inaccessible on un-played instant lottery tickets due to a portion of the code being covered by SOC. In some versions, the validation code is also embodied as a barcode hidden under the SOC such that it cannot be scanned until the instant lottery ticket is scratched to expose the barcode, and in other versions there is some validation file information in addition to the inventory control information in the ticket back barcode in an encrypted format. Therefore, the security of the system is partly derived from the validation file being unassociated with the ship file as well as the physical un-played ticket's inventory control information. Both the ship and validation files are generated by the ticket manufacturer before the tickets are shipped to a lottery. Lottery logistical and validation systems require the ship and validation files to be loaded on the lottery system prior to instant tickets being shipped to retailers and placed on sale for purchase. Once loaded onto the system, the basic validation file typically cannot be altered (other than flagged additions—e.g., redeemed, stolen, etc.) thereby ensuring the integrity of the instant ticket game and its predetermined payout.

As mentioned above, one issue with the above-described instant lottery tickets is that there are substantial variations in the structures, configurations, and arrangements of the individual components of the inventory control numbers and barcodes for such instant lottery tickets. These variations most often occur on a jurisdictional basis and can occur on a manufacturer basis. This wide variety of the structures, configurations, and arrangements of the individual components of the inventory control numbers and barcodes for instant lottery tickets limits the types of systems that can be used to activate, sell, validate, and redeem such instant lottery tickets. For example, the above-described example instant lottery ticket packs must be activated by dedicated lottery terminals prior to purchase of any of the instant lottery tickets in such instant lottery ticket packs. This limits the locations that such instant lottery tickets can be purchased to the locations that have dedicated lottery terminals.

Various embodiments of the present disclosure address these various issues to enable lottery tickets such as instant lottery tickets and draw lottery tickets to be activated, purchased, validated, and/or redeemed via POS systems at a substantially greater quantity of locations.

Various embodiments of the present disclosure provide a POS lottery ticket data interceptor for POS systems, and systems and methods employing such POS lottery ticket data interceptors with POS systems that enable activation, validation, purchase and/or redemption of lottery tickets by such POS systems (such as but not limited to conventional retailer or wholesaler POS systems). This substantially expands the quantity of locations that such different lottery tickets can be purchased and redeemed.

FIG. 1 illustrates an example POS lottery ticket data interceptor 10 of one example embodiment of the present disclosure that is configured to be communicatively and operably connected to and between a POS system scanner and a POS system terminal of a POS system. The POS lottery ticket data interceptor 10 includes: (1) a housing 20; (2) a POS system scanner connector 22; (3) a lottery terminal connector 24; (4) a data transmitter 30; (5) a data receiver 40; (6) a processor 50; (7) a memory device 60; (8) a display device 70 (which can include a touch-screen input device); and (9) a power source 80 (and one or more associated power or mode switches 82). In various embodiments, the POS lottery ticket data interceptor 10 additionally includes: (10) a printer connector 26.

In alternative embodiments, the POS lottery ticket data interceptor can be configured without a display device. In such embodiments, the POS lottery ticket data interceptor can have one or more other status indicators (such as one or more LED lights).

In alternative embodiments, the POS lottery ticket data interceptor can be configured with an additional scanner (such as a dedicated lottery ticket scanner). In such embodiments, the POS lottery ticket data interceptor can be connected to the POS system lottery terminal, but the operator can use the additional dedicated scanner for scanning lottery tickets or lottery ticket sheets and to obtain lottery ticket related data.

The POS lottery ticket data interceptor 10 may sometimes be referred to herein as the POS data interceptor or the POS interceptor for brevity. This example POS data interceptor 10 is thus configured to be communicatively and operably connected by hardwires to both of and between a POS system scanner and a POS system terminal of a POS system. In the alternative embodiments where the POS lottery ticket data interceptor 10 includes an additional scanner, the POS lottery ticket data interceptor 10 is configured to be communicatively and operably connected by hardwires to both of and between that additional scanner and a POS system terminal of a POS system. The POS interceptor 10 is configured to receive and transmit data in the form of electrical signals or communications in a conventional manner or any new matter subsequently developed. For brevity, the data signals may be referred to herein is data or different types of data as described below.

The POS data interceptor 10 is generally configured to: (i) monitor and intercept scan data received from a POS system scanner; (ii) analyze the scan data received from the POS system scanner; (iii) if the scan data is not lottery ticket related data, relay or otherwise transmit that scan data to the POS system terminal (in a conventional manner); (iii) if the scan data is lottery ticket related data, transmit data based on that lottery ticket related data in real time to a lottery central system; (iv) receive lottery ticket data from the lottery central system; and (v) transmit data to the POS system terminal and thus the POS system to enable and facilitate the purchase of a lottery ticket.

More specifically, the housing 20 provides a suitable compartment for supporting various components of the POS data interceptor 10 in a compact and durable manner. The housing 20 can be configured in any suitable manner.

The POS system scanner connector 22 is supported by the housing 20, connected to the processor 50, and is configured to be connected to a POS system scanner (such as via a plug connected to a wire extending from the POS system scanner). The POS system scanner connector 22 is configured to facilitate the receipt of scan data from the POS system scanner after the POS system scanner scans a code (such as a barcode) on a product or a lottery ticket information provider and provide that scan data to the processor 50. For purposes of this disclosure, as further explained below, a lottery ticket information provider can be a lottery ticket itself or a provider of information relating to lottery ticket.

The lottery terminal connector 24 is supported by the housing 20, connected to the processor 50, and is configured to be connected a POS system terminal (such as via a wire plugged into the POS system terminal and plugged into the POS lottery terminal connector 24). The lottery terminal connector 24 is configured to facilitate the transmission of scan data from the processor 50 (or the POS system scanner) to the POS system terminal as well as the transmission of lottery ticket data to the POS system terminal. The lottery ticket data can be based on data received by the POS data interceptor 10 from a lottery central system or other suitable lottery ticket data. In various embodiments, the lottery terminal connector 24 of the POS data interceptor 10 can include a wire connected to the housing 20 and a plug at the end of the wire that is configured to be connected to the POS system terminal (in place of the plug from the POS system scanner typically connected to the POS system terminal).

The data transmitter 30 and the data receiver 40 are supported by the housing, connected to the processor 50, and can be any suitable combined device or separate devices that is/are configured to communicate data on a real time basis with the lottery central system (such as via a suitable data network), the POS system terminal, or other suitable devices such as explained below.

The processor 50 and the memory device 60 are supported by the housing and can be any suitable combined device or separate devices that is/are configured to process data on a real time basis and to control certain of the components of the POS data interceptor 10 such as discussed herein. The processor can include one or more suitable processing devices such as, but not limited to, a general-purpose processor, a special-purpose processor, a digital-signal processor, one or more microprocessors, one or more microprocessors in association with a digital-signal processor core, one or more application-specific integrated circuits, one or more field-programmable gate array circuits, one or more integrated circuits, and/or a state machine. The memory device can include one or more suitable memory devices such as, but not limited to, read-only memory, random-access memory, one or more digital registers, cache memory, one or more semiconductor memory devices, magnetic media such as integrated hard disks and/or removable memory, magneto-optical media, and/or optical media. The memory device stores instructions executable by the processor to control operation of the POS data interceptor 10 such as described herein.

In various embodiments, the memory device stores computer program instructions may be provided to the processor, such that the instructions, which execute via the processor of the computer or other programmable instruction execution apparatus, create a mechanism for implementing various functions/acts specified in the present disclosure. These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified herein. The computer program instructions may also be loaded onto a computer, other programmable instruction execution apparatus, or other devices to cause a series of operational steps to be performed on the computer, other programmable apparatuses, or other devices to produce a computer implemented process such that the instructions which execute on the computer or other programmable apparatus provide processes for implementing the functions/acts specified herein.

In the embodiments that include the display device 70, the display device 70 is supported by the housing 20, connected to the processor 50, and configured to display various information regarding the POS data interceptor 10 under the control of the processor 50. The displayed information can include the different states, modes, or operating conditions of the POS data interceptor 10, or can be related to the data processed by the POS data interceptor 10. In the alternative embodiments that include the status indicator(s), each such status indicator is supported by the housing 20, connected to the processor 50, and configured to indicate various information regarding the POS data interceptor 10 under the control of the processor 50. The indicator(s) can indicate different states, modes, or operating conditions of the POS data interceptor 10, or can be related to the data processed by the POS data interceptor 10.

The power source 80 and the power and/or mode switch (es) 82 are supported by the housing 20 and can be any suitable power source and switch(es) that function to provide electrical power to the various components of the POS data interceptor 10, the turn the POS data interceptor 10 on and off, and/or change modes of the POS data interceptor 10.

Figure 2:
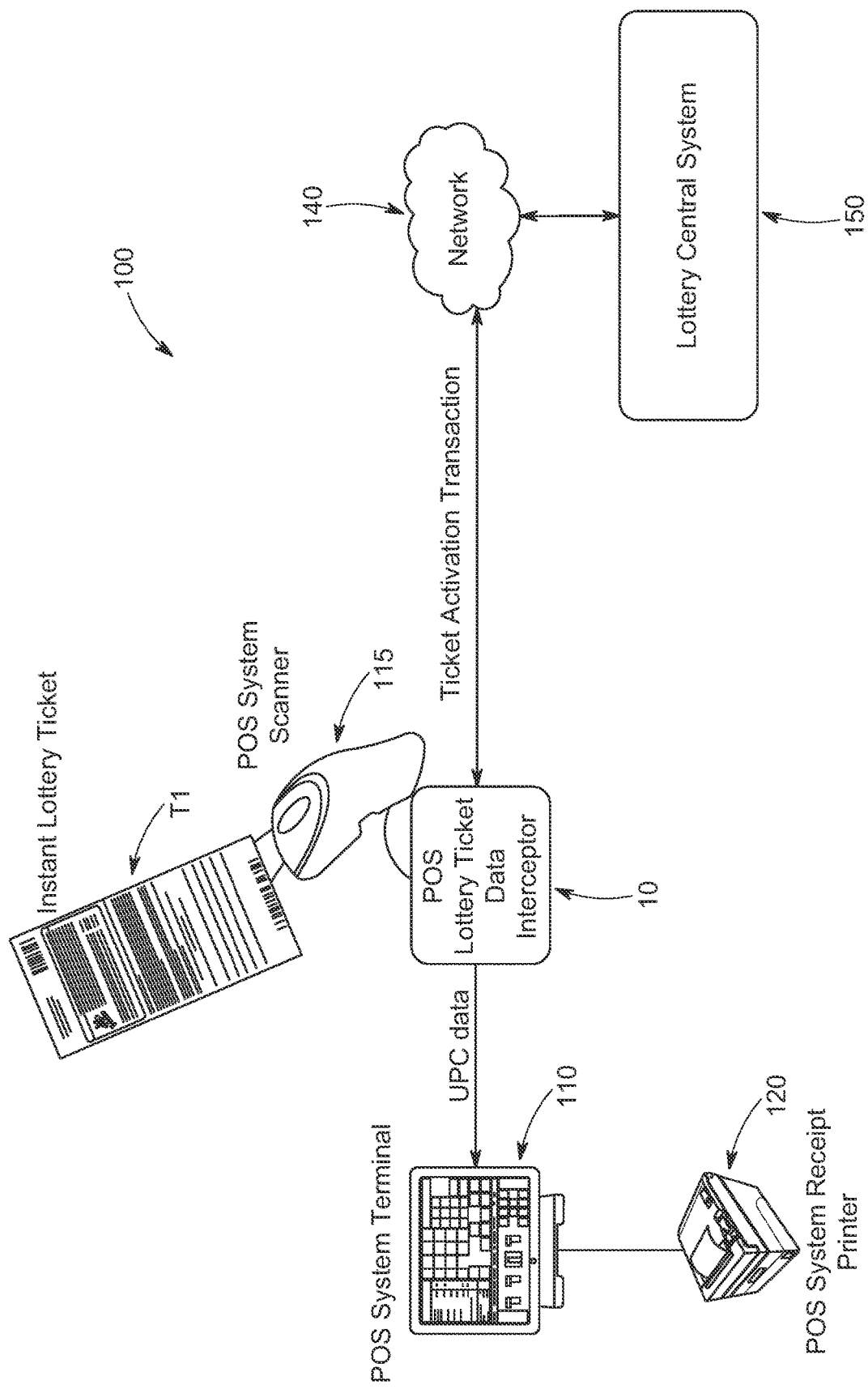
FIG. 2 is a diagrammatic view of a system and method employing a POS lottery ticket data interceptor for a POS system in accordance with a first example embodiment of the present disclosure.

FIG. 2 illustrates a system 100 (and related method) employing a POS data interceptor 10 with a lottery central system 150, a POS system scanner 115, a POS system terminal 110 of a POS system (not shown), and POS system receipt printer 120 in accordance with a first example embodiment of the present disclosure. In this example embodiment, the lottery ticket information provider is a scratch off instant lottery ticket T1 and the system 100 facilitates the purchase of this scratch off instant lottery ticket T1.

In operation of this example embodiment, an operator of the POS system scanner 115 scans the I2of5 barcode (that contains Game/Pack/Ticket ID) of the instant lottery ticket T1 that a customer has indicated that the customer wants to purchase. Such instant lottery tickets can be maintained and displayed close to the POS system terminal 110 or in another suitable location. It should be appreciated that such instant lottery tickets can be activated on a pack or on a ticket level as discussed herein. The POS data interceptor 10 monitors the scan data from scans by the POS system scanner 115 and reacts if lottery ticket related data (including the I2of5 content) is received from the POS system scanner 115. Specifically, responsive to receiving lottery ticket related data (including the I2of5 content), the POS data interceptor 10 decodes the lottery ticket related data (including the I2of5 content) and creates in real time ticket activation request data based on the I2of5 content. The POS data interceptor 10 transmits via the data transmitter 30 (and via a suitable data network 140) in real time the ticket activation request data to the lottery central system 150. The lottery central system 150 processes the ticket activation request data and creates in real time ticket activation response data. The lottery central system 150 also updates the lottery ticket status to activated in its systems (assuming the lottery ticket activation request data relates to a valid lottery ticket). The POS lottery ticket data interceptor 10 waits for the ticket activation response data from the lottery central system 150 before it sends an UPC code to the POS system. The ticket activation response data can either include a ticket activation confirmation or a ticket activation denial. The lottery central system 150 transmits in real time (and via the suitable data network 140) the ticket activation response data to the data receiver 40 of the POS lottery ticket data interceptor 10. Responsive to receiving the ticket activation response data, POS lottery ticket data interceptor 10 determines in real time if the ticket activation response data includes a ticket activation confirmation or a ticket activation denial. If the ticket activation response data includes a ticket activation denial, the POS lottery ticket data interceptor 10 does not send a UPC code to the POS system terminal 110. Rather, the POS lottery ticket data interceptor 10 sends suitable error code data to the POS system terminal 110 for enabling the POS system terminal 110 to display and such that an operator can indicate the error or issue to the customer and address such error or issue in a suitable manner. If the ticket activation response data includes a ticket activation confirmation, the POS lottery ticket data interceptor 10 looks up in its memory device 60 the UPC code associated with this instant lottery ticket T1 based on the Game Identification ("ID") it has stored and creates and transmits UPC data for this instant lottery ticket T1 to the POS system terminal 110. Responsive to receipt of this UPC data for this instant lottery ticket T1, the POS system terminal 110 adds a lottery sale to the POS shopping cart that it created for the customer in a conventional manner. The operator of the POS system terminal 110 obtains payment for all items in this POS shopping cart for the customer and provides the customer with the instant lottery ticket T1 and a receipt printed by the POS system receipt printer 120.

In this example embodiment, if the scan data received by the POS data interceptor 10 from the POS system scanner 115 does not include lottery ticket related data, the POS data interceptor 10 relays or otherwise transmits that scan data to the POS system terminal 110, and the POS system terminal 110 processes that scan data in a conventional manner.

In this example embodiment, the memory device 60 stores data regarding the UPC codes for the instant lottery ticket T1 (and other lottery tickets) available at the location of the POS system. In various embodiments, obtaining this data can be part of initiation and/or update processes between the POS data interceptor 10 and the lottery central system. In various embodiments, the lottery system and the retailer will agree on the respective different UPC codes that the POS data interceptor 10 will provide to the lottery system terminal 110 for all of the different types of lottery tickets that will be sold by such retailer. In various embodiments, the retailer will be responsible for ensuring all such UPC codes (and related definitions) are loaded into or otherwise known by POS system and lottery system and/or the retailer will have a remote tool to update POS Connect with the same UPC codes (and related definitions).

In this example embodiment, the instant lottery ticket T1 from the pack of instant lottery tickets that contains the instant lottery ticket T1, is activated at the time of purchase and the pack does not need to be activated before such purchase of the instant lottery ticket T1.

In various other embodiments, lottery ticket pack activation and other pack management activities by retailers will be preformed separately from the system 10 and from the POS system. In various such embodiments, such actions are provided through a separate system that enables retailers access to manage and administrate the lottery category for reporting, invoicing, ordering, communications etc. This can include the ability to order more instant lottery tickets, and can support lottery ticket pack management including pack activation.

In various other example embodiments, before allowing a customer to purchase any instant lottery tickets from the pack of instant lottery tickets that contains the instant lottery ticket T1, the system can enable an operator of the POS system scanner 115 to activate the pack of instant lottery tickets containing instant lottery ticket T1. This can be done in any suitable manner such as in the following example manner. In this example, the POS data interceptor 10 has a pack activation mode and the operator of the POS system scanner 115 can place the POS data interceptor 10 in this pack activation mode. In this pack activation mode, the operator can scan the I2of5 barcode (that contains Game/Pack/Ticket ID) of one of the instant lottery tickets in a pack (such as the pack that contains the instant lottery ticket T1). In this pack activation mode, the POS data interceptor 10 monitors the scan data from scans by the POS system scanner 115 and reacts and responsive to receiving lottery ticket related data (including I2of5 content). Specifically, the POS data interceptor 10 decodes the I2of5 content and creates in real time ticket pack activation request data based on the I2of5 content. The POS data interceptor 10 transmits via the data transmitter 30 (and via the suitable data network 140) in real time the ticket pack activation request data to the lottery central system 150. The lottery central system 150 processes the ticket pack activation request data and creates in real time ticket pack activation response data. The lottery central system verifies that this ticket pack activation request data came from the correct receiver of this pack of instant lottery tickets and creates ticket pack activation response data. The ticket pack activation response data can either include a ticket pack activation confirmation or a ticket pack activation denial. The lottery central system 150 transmits in real time (and via the suitable data network 140) the ticket pack activation response data to the data receiver 40 of the POS lottery ticket data interceptor 10. Responsive to receiving the ticket pack activation response data, the POS lottery ticket data interceptor 10 determines in real time if the ticket pack activation response data includes a ticket pack activation confirmation or a ticket pack activation denial. If the ticket pack activation response data includes a ticket activation denial, the POS lottery ticket data interceptor 10 sends suitable error code data to the POS system terminal 110 for enabling the POS system terminal 110 to display and such that an operator can indicate the error or issue to address such error or issue in a suitable manner. If the ticket pack activation response data includes a ticket pack activation confirmation, the POS lottery ticket data interceptor 10 displays via its display device 70 a confirmation to the operator that the ticket pack has been activated. Thereafter, the instant lottery tickets in that pack are ready for purchase.

Figure 3:
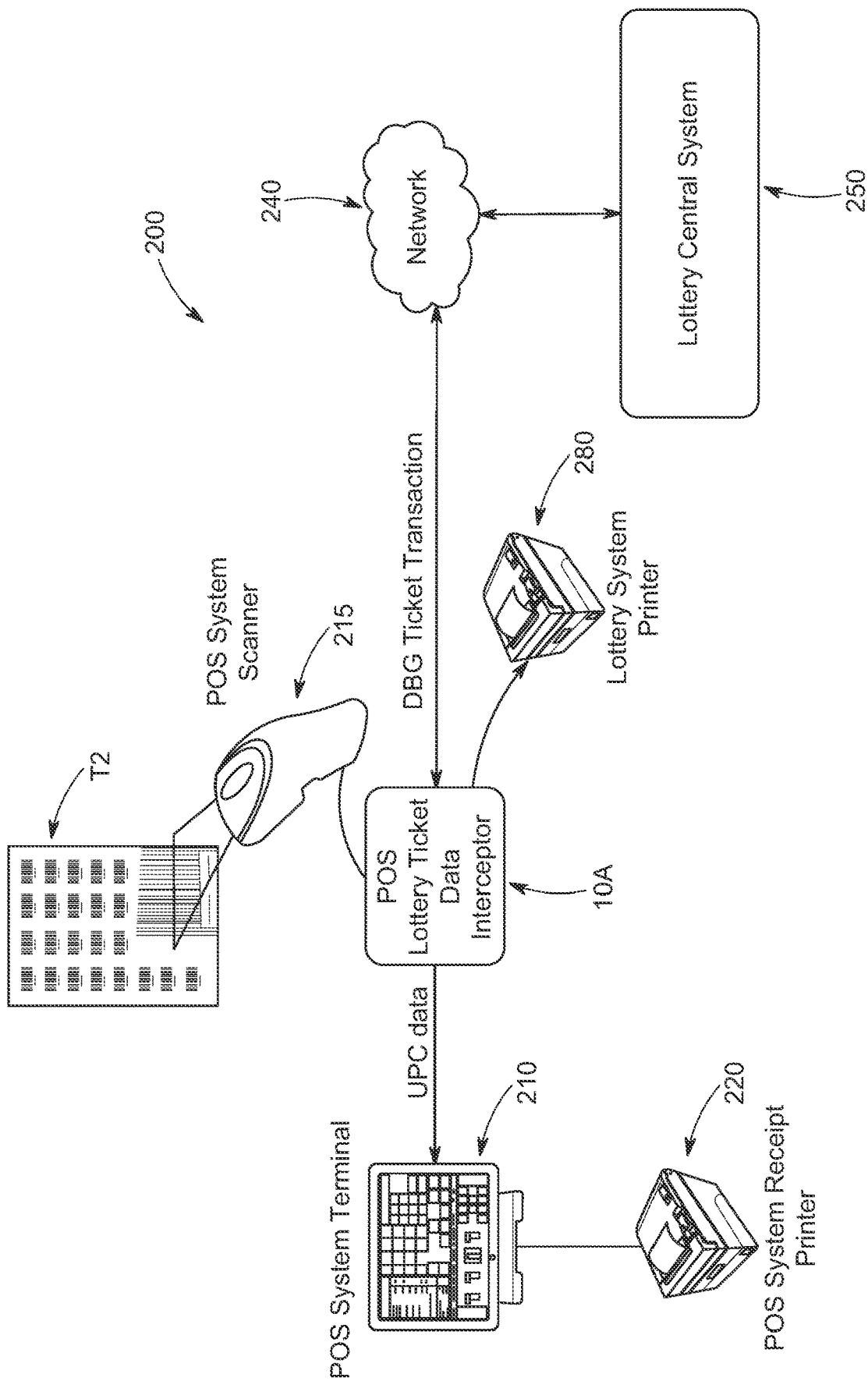
FIG. 3 is a diagrammatic view of a system and method employing a POS lottery ticket data interceptor for a POS system in accordance with a second example embodiment of the present disclosure.

FIG. 3 illustrates a system 200 (and related method) employing a POS data interceptor 10A with a lottery central system 250, a POS system scanner 215, a POS system terminal 210, and POS system receipt printer 220 in accordance with a second example embodiment of the present disclosure. In this example embodiment, the lottery ticket information provider is a pre-printed draw lottery ticket DBG price sheet T2 (for a draw-based game) that includes a plurality of different UPC codes for a plurality of different draw lottery tickets for a plurality of different draw lottery games (and purchase prices for such lottery tickets). In various embodiments, each different lottery game and each different price point for such lottery game has a different UPC code associated therewith. The system 200 facilitates the purchase of these draw lottery tickets.

In operation of this example embodiment, an operator of the POS system scanner 215 scans the respective UPC barcode of the draw lottery ticket DBG price sheet T2 corresponding to a draw lottery ticket that a customer has indicated that the customer wants to purchase. Such draw lottery ticket DBG price sheet T2 can be maintained and displayed close to the POS system terminal 110 or in another suitable location. In other embodiments, other methods for the DBG UPC code scanning can be employed. For example, the a playcard that has the lottery game and purchase price with a barcode printed for operator to scan the UPC can be employed. The POS data interceptor 10A monitors the scan data from scans by the POS system scanner 215 and reacts if lottery ticket related data (including this UPC barcode) is received from the POS system scanner 215. Specifically, responsive to receiving lottery ticket related data (including this UPC barcode), the POS data interceptor 10A creates in real time draw game wager request data based on this UPC barcode. The POS data interceptor 10 transmits via the data transmitter 30 (and via a suitable data network 240) in real time the draw game wager request data to the lottery central system 250. The lottery central system 250 processes the draw game wager request data and creates in real time draw game wager response data. In various embodiments, the lottery system processes the wager as any other wager request from a 3rd party system. In various embodiments, a front-end/gateway system can be employed to enable 3rd party systems to transact with the lottery central system. The draw game wager response data can either include a wager confirmation or a wager denial. The lottery central system 250 transmits (via the suitable data network 240) in real time the draw game wager response data to the data receiver 40 of the POS lottery ticket data interceptor 10A. Responsive to receiving the draw game wager response data, the POS lottery ticket data interceptor 10A determines in real time if the draw game wager response data includes a wager confirmation or a wager denial. If the draw game wager response data includes a wager denial, the POS lottery ticket data interceptor 10A sends suitable error code data to the POS system terminal 210 for enabling the POS system terminal 210 to display and such that an operator can indicate the error or issue to address such error or issue in a suitable manner. If the draw game wager response data includes a wager confirmation, the POS lottery ticket data interceptor 10A causes the lottery system printer 280 to print the draw lottery ticket and transmits the UPC code for this draw lottery ticket to the POS system terminal 210. The POS system terminal 210 adds this lottery sale to the POS shopping cart that it created for the customer. The operator of the POS system terminal 210 obtains payment for all items in the POS shopping cart for the customer and provides the customer with the printed lottery ticket and a receipt printed by the POS system receipt printer 220.

In this example embodiment, if the scan data received by the POS data interceptor 10A from the POS system scanner 215 does not include lottery ticket related data, the POS data interceptor 10A relays or otherwise transmits that scan data to the POS system terminal 210, and the POS system terminal 210 processes that scan data in a conventional manner.

In this example embodiment, the POS data interceptor 10A or the lottery central system can determine the symbols (such as the numbers) for the draw lottery ticket. For example, the numbers for a play of a quick pick DBG lottery ticket can be determined by the lottery central system and can be part of the wager confirmation response. The POS data interceptor 10A can cause the lottery ticket with these numbers to be printed on the connected lottery system printer 280.

Figure 4:
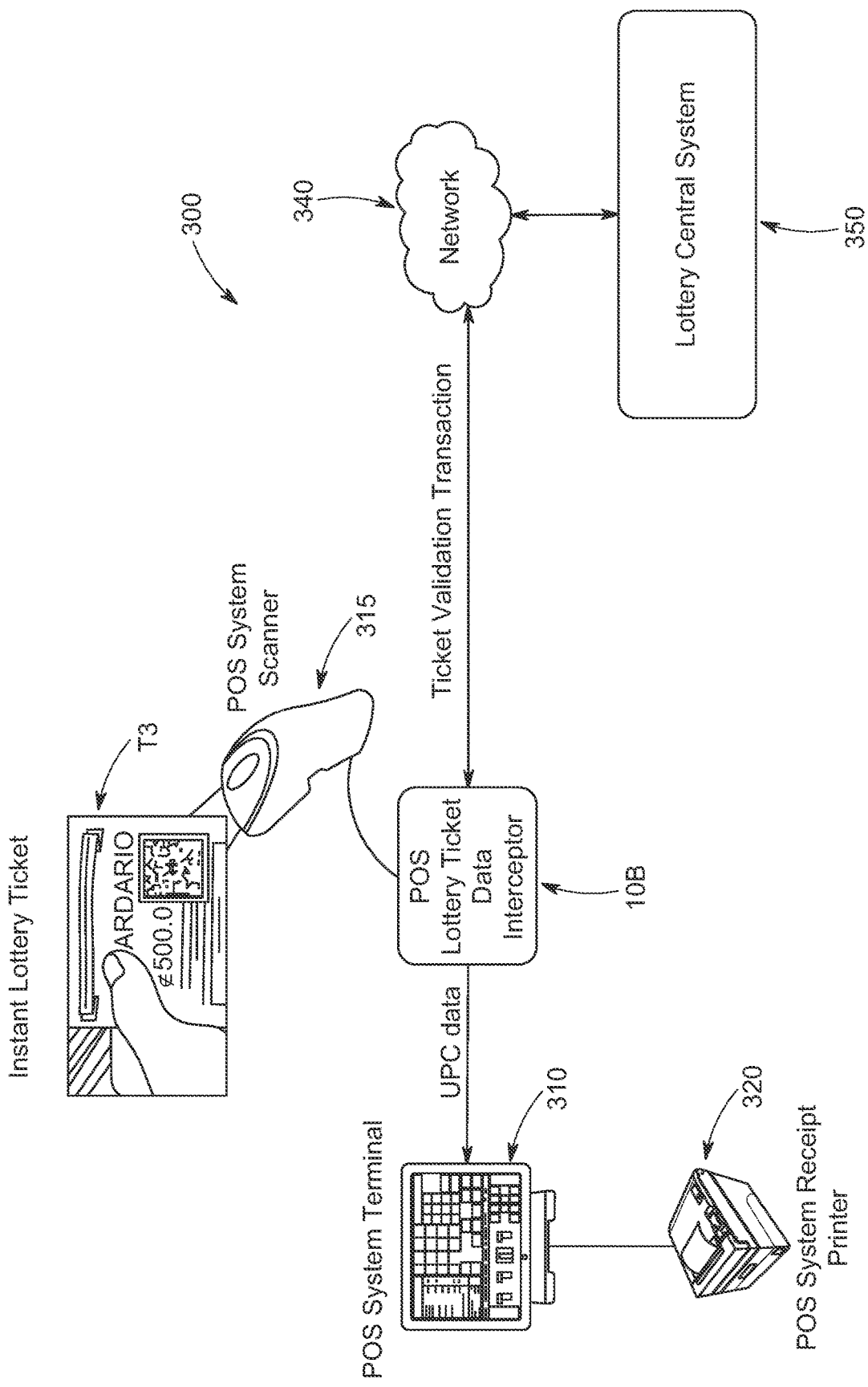
FIG. 4 is a diagrammatic view of a system and method employing a POS lottery ticket data interceptor for a POS system in accordance with a third example embodiment of the present disclosure.

FIG. 4 illustrates a system 300 (and related method) employing a POS data interceptor 10B with a lottery central system 350, a POS system scanner 315, a POS system terminal 310, and POS system receipt printer 320 in accordance with a third example embodiment of the present disclosure. In this example embodiment, the lottery ticket information provider is a scratch off instant lottery ticket T3 and the system 300 is configured to validate the instant lottery ticket T3 for redemption (and thus payout of any winning amounts to the holder (customer) of the instant lottery ticket T3).

In operation of this example embodiment, an operator of the POS system scanner 315 scans the ticket redemption (PDF417) barcode of the instant lottery ticket T3 that a customer has indicated that the customer wants to redeem. The POS data interceptor 10B monitors the scan data from scans by the POS system scanner 315 and reacts if lottery ticket redemption related data is received from the POS system scanner 315. Specifically, responsive to receiving lottery ticket redemption related data, the POS data interceptor 10B decodes the lottery ticket redemption data and creates in real time ticket redemption request data based thereon. The POS data interceptor 10B transmits via the data transmitter 30 (and via a suitable data network 340) in real time the ticket redemption request data to the lottery central system 350. The lottery central system 350 processes the ticket redemption request data and creates in real time ticket redemption response data. The lottery system verifies the status and prize of lottery ticket and provides the relevant response as well as updates the status of lottery ticket in it database(s). The ticket redemption response data can include data relating to the instant lottery ticket T3 indicating regarding such ticket one of the following categories: (1) no win, (2) low-tier win amount, (3) mid-tier win amount, and (4) high-tier win amount. The ticket redemption response data can include for each of the low-tier win amount and the mid-tier win amount, a respective amount to be paid to the customer. The ticket redemption response data can include for the high-tier win amount an amount won by the customer, that the customer must seek payment in an alternative manner from the lottery system.

The lottery central system 350 transmits (via the suitable data network 340) in real time the ticket redemption response data to the data receiver 40 of the POS lottery ticket data interceptor 10B. Responsive to receiving the ticket redemption response, POS lottery ticket data interceptor 10B determines in real time one of four different UPC codes. Each different code corresponds to a different on of the following categories: (1) no win, (2) low-tier win amount, (3) mid-tier win amount, and (4) high-tier win amounts. As indicated above, this ticket redemption response can include data regarding the prize amounts to be paid to the customer. This can be performed in different manners in accordance with the present disclosure.

The POS lottery ticket data interceptor 10B looks up in its memory device 60 the UPC code corresponding to the respective category of the instant lottery ticket T3 and creates and transmits UPC data for this instant lottery ticket T3 to the POS system terminal 310. In various embodiments, the UPC code type can be configured such that adjustments can be made to the value of the goods per transaction. This is somewhat similar to how some goods like fruits and vegetables with a total weight price scanned at POS system has a variable price when scanned.

Responsive to the UPC code corresponding to the no win category, the POS system terminal 310 can provide a receipt printed by the POS system receipt printer 320 but does not provide the customer any pay-out for this instant lottery ticket T3.

Responsive to the UPC code corresponding to the low-tier win amount, the POS system terminal 310 adds a lottery ticket credit to the POS shopping cart if the UPC code corresponds to the low-tier win amount. The operator of the POS system terminal 310 can provide a payment to the customer (depending on all items in the POS shopping cart for the customer) and can provide a receipt printed by the POS system receipt printer 320. The receipt can be part or a separate shopping checkout receipt (such as a receipt printed at checkout on the POS system.

Responsive to the UPC code corresponding to the mid-tier win amount, the POS system terminal 310 adds a lottery ticket credit to the POS shopping cart if the UPC code corresponds to the mid-tier win amount. The operator of the POS system terminal 310 can provide a payment to the customer (depending on all items in the POS shopping cart for the customer) and can provide a receipt printed by the POS system receipt printer 320. In various embodiments, a mid-tier win amount can require approval by more than one operator. The receipt can be part or a separate shopping checkout receipt (such as a receipt printed at checkout on the POS system.

Responsive to the UPC code corresponding to the high tier win amount, the POS system terminal 310 can provide a receipt printed by the POS system receipt printer 320. The printed receipt can include instructions for the customer for obtaining the high-tier pay-out. In other embodiments, such instructions can be separately provided to the customer.

In this example embodiment, if the scan data received by the POS data interceptor 10 from the POS system scanner 315 does not include lottery ticket related data, the POS data interceptor 10 relays or otherwise transmits that scan data to the POS system terminal 310, and the POS system terminal 310 processes that scan data in a conventional manner.

In this example embodiment, the memory device 60 stores data regarding the UPC codes for the instant lottery ticket T3.

Figure 5:
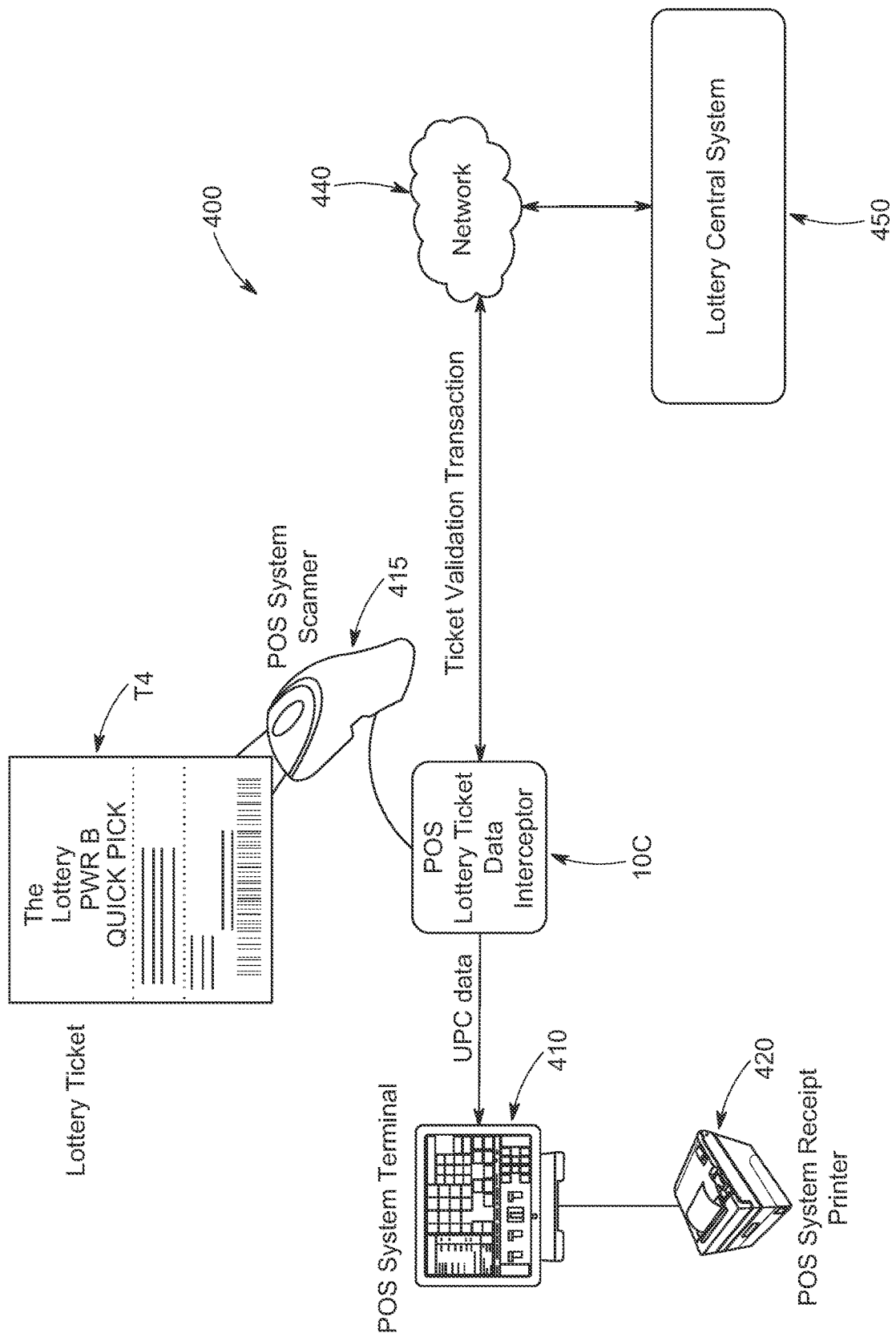
FIG. 5 is a diagrammatic view of a system and method employing a POS lottery ticket data interceptor for a POS system in accordance with a fourth example embodiment of the present disclosure.

FIG. 5 illustrates a system 400 (and related method) employing a POS data interceptor 10C with a lottery central system 450, a POS system scanner 415, a POS system terminal 410, and POS system receipt printer 420 in accordance with a fourth example embodiment of the present disclosure. In this example embodiment, the lottery ticket information provider is a draw lottery ticket T4 and the system 400 is configured to validate the draw lottery ticket T4 for redemption (and thus payout of any winning amounts to the holder (customer) of the draw lottery ticket T4).

In operation of this example embodiment, an operator of the POS system scanner 415 scans the ticket ID barcode of the draw lottery ticket T4 that a customer has indicated that the customer wants to redeem. The POS data interceptor 10C monitors the scan data from scans by the POS system scanner 415 and reacts if lottery ticket redemption related data is received from the POS system scanner 415. Specifically, responsive to receiving lottery ticket redemption related data, the POS data interceptor 10C decodes the lottery ticket redemption data and creates in real time ticket redemption request data based thereon. The POS data interceptor 10C transmits via the data transmitter 30 (and via a suitable data network 440) in real time the ticket redemption request data to the lottery central system 450. The lottery central system 450 processes the ticket redemption request data and creates in real time ticket redemption response data. The lottery system validates the DBG lottery ticket similar to other draw-based game validations. The ticket redemption response data determine the actions of POS data interceptor 10C. The ticket redemption response data can include a ticket redemption response that includes data regarding the ticket indicating one of the following categories: (1) no win; (2) low-tier win amount; (3) mid-tier win amount; and (4) high-tier win amount. As indicated above, this ticket redemption response can include data regarding the prize amounts to be paid to the customer. This can be performed in different manners in accordance with the present disclosure.

The lottery central system 450 transmits (via the suitable data network 440) in real time the ticket redemption response data to the data receiver 40 of the POS lottery ticket data interceptor 10C. Responsive to receiving the ticket redemption response data, POS lottery ticket data interceptor 10C determines in real time one of four different UPC codes. Each different code corresponds to a different one of the following categories: (1) no win; (2) low-tier win amount; (3) mid-tier win amount; and (4) high-tier win amount.

The POS lottery ticket data interceptor 10C looks up in the memory device 60 the UPC code and creates and transmits UPC data for this draw lottery ticket T4 to the POS system terminal 410.

Responsive to the UPC code corresponding to the no win category, the POS system terminal 410 can provide a receipt printed by the POS system receipt printer 420 but does not provide the customer any pay-out for this draw lottery ticket T4.

Responsive to the UPC code corresponding to the low-tier win amount, the POS system terminal 410 adds a lottery ticket credit to the POS shopping cart if the UPC code corresponds to the low-tier win amount. The operator of the POS system terminal 410 can provide a payment to the customer (depending on all items in the POS shopping cart for the customer) and can provide a receipt printed by the POS system receipt printer 420.

Responsive to the UPC code corresponding to the mid-tier win amount, the POS system terminal 410 adds a lottery ticket credit to the POS shopping cart if the UPC code corresponds to the mid-tier win amount. The operator of the POS system terminal 410 can provide a payment to the customer (depending on all items in the POS shopping cart for the customer) and can provide a receipt printed by the POS system receipt printer 420. In various embodiments, a mid-tier win amount can require approval by more than one operator. The receipt can be part or a separate shopping checkout receipt (such as a receipt printed at checkout on the POS system.

Responsive to the UPC code corresponding to the high tier win amount, the POS system terminal 410 can provide a receipt printed by the POS system receipt printer 420. The printed receipt can include instructions for the customer for obtaining the high-tier pay-out. In other embodiments, such instructions can be separately provided to the customer.

In this example, if the scan data received by the POS data interceptor 10C from the POS system scanner 415 does not include lottery ticket related data, the POS data interceptor 10C relays that scan data to the POS system terminal 410, and the POS system terminal 410 processes that scan data in a conventional manner.

In this example, the memory device 60 stores data regarding the UPC codes for the draw lottery ticket T4.

Figure 6:
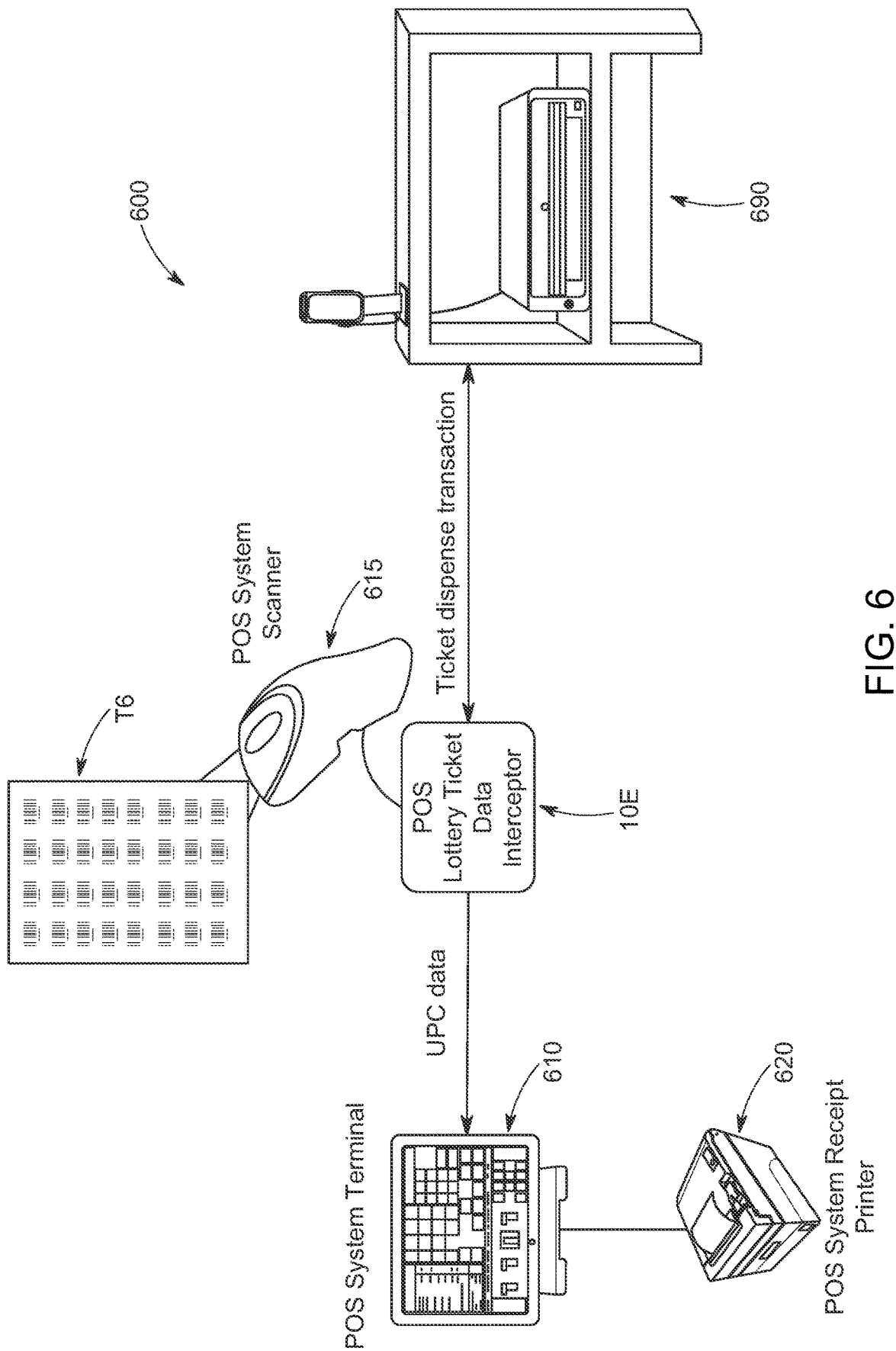
FIG. 6 is a diagrammatic view of a system and method employing a POS lottery ticket data interceptor for a POS system in accordance with a fifth example embodiment of the present disclosure.

FIG. 6 illustrates a system employing a POS lottery ticket data interceptor for a POS system in accordance with a fifth example embodiment of the present disclosure.

More specifically, FIG. 6 illustrates a system 600 (and related method) employing a POS data interceptor 10E, a POS system scanner 615, a POS system terminal 610, a POS system receipt printer 620, and a POS system dispenser 690 in accordance with a fifth example embodiment of the present disclosure. In this example embodiment, the lottery ticket information provider is a pre-printed instant lottery ticket price sheet T6 that includes a plurality of different UPC codes for a plurality of different instant lottery tickets and their respective prices. The system 600 facilitates the purchase of these instant lottery tickets.

In operation of this example embodiment, an operator of the POS system scanner 615 scans the respective UPC barcode of the instant lottery ticket price sheet T6 corresponding to an instant lottery ticket that a customer has indicated that the customer wants to purchase. Such instant lottery ticket price sheet T6 can be maintained and displayed close to the POS system terminal 610 or in another suitable location. The POS data interceptor 10E monitors the scan data from scans by the POS system scanner 615 and reacts if lottery ticket related data (including the UPC barcode) is received from the POS system scanner 615. Specifically, responsive to receiving lottery ticket related data (including the UPC barcode), the POS data interceptor 10E creates in real time dispense request data based on the UPC barcode. The POS data interceptor 10E transmits via the data transmitter 30 in real time the dispense request data to the POS dispenser 690. The POS dispenser 690 processes the dispense request data and creates and dispenses an instant lottery ticket. The POS dispenser 690 also creates in real time dispense response data. The dispense response data can either include a dispense confirmation or a dispense denial. The POS dispenser 690 transmits in real time the dispense response data to the data receiver 40 of the POS lottery ticket data interceptor 10E. Responsive to receiving the dispense response data, POS lottery ticket data interceptor 10E determines in real time if the dispense response data includes a dispense confirmation or a dispense denial. If the dispense response data includes a dispense denial, the POS lottery ticket data interceptor 10E sends suitable error code data to the POS system terminal 610 for enabling the POS system terminal 610 to display and such that an operator can indicate the error or issue to address such error or issue in a suitable manner. If the dispense response data includes a dispense confirmation, the POS lottery ticket data interceptor 10E transmits the UPC code for this instant lottery ticket to the POS system terminal 610. The POS system terminal 610 adds a lottery sale to the POS shopping cart that it created for the customer. The operator of the POS system terminal 610 obtains payment for all items in the POS shopping cart for the customer. The operator of the POS system terminal provides the customer with the printed instant lottery ticket created by the POS dispenser 690 and a receipt printed by the POS system receipt printer 620.

In this example, if the scan data received by the POS data interceptor 10E from the POS system scanner 615 does not include lottery ticket related data, the POS data interceptor 10E relays that scan data to the POS system terminal 610, and the POS system terminal 610 processes that scan data in a conventional manner.

In various embodiment, the POS dispenser 690 only communicates with a lottery central system (not shown in FIG. 6) though the POS data interceptor 10E to receive data from and provide data regarding the instant lottery ticket to the lottery central system.

In various alternative embodiments, the POS dispenser 690 can also communicate with a lottery central system (not shown in FIG. 6) to provide data regarding the instant lottery ticket to the lottery central system.

In various embodiments, the customer can function as the operator of the POS system where the POS system is configured for self-check-out by the customer. In various such embodiments, certain of the actions described above that are taken by the operator would be taken by the customer to effectuate the purchase of one or more lottery tickets. Such actions can include the scanning actions and the receipt of payment actions (such as via a credit or debit card) as described above.

These various example embodiments of the present disclosure provide a series of advantages that enable lottery tickets to be purchased and redeemed via POS systems. The advantages include but are not limited to the following advantages: (a) providing a relatively low cost and in obtrusive device (the interceptor) that can be employed in each checkout lane in a wholesaler facility, a retailer facility, or other facility that enables the POS system therein to be used for the activation, purchase, validation, and/or redemption of lottery tickets; (b) providing a dedicated lottery printer at each POS system terminal for printing certain lottery tickets; (c) providing easy installation of such devices; (d) not requiring substantial changes to how operators use such devices or collect payments from customers; (e) providing such devices with limited required additional training by operators in such facilities to use such devices; (f) maintaining security needs for lottery systems and/or the retailer's own network(s); (g) providing interceptors that can connect to the lottery systems in real time using an operator's network, a dedicated network, or other suitable network; (h) providing for purchase of lottery tickets that are recorded on the POS systems with pre-defined UPC codes; (i) enabling lotteries and/or retailers to manage UPC code tables on POS lottery ticket data interceptors from remote locations; (j) generating POS payment receipts that function as payment confirmations for lottery purchases; (k) providing lottery instant ticket pack receipts in certain embodiments); and (l) providing central lottery system setup to support instant lottery ticket activation on a pack basis or a ticket by ticket basis (if needed).

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A point-of-sale (POS) lottery ticket data interceptor communicatively and operably connectable to a POS system comprising a POS system scanner that comprises a scanner housing and a POS system terminal that comprises a terminal housing, the POS lottery ticket data interceptor comprising:
    an interceptor housing that is separate from the scanner housing and the terminal housing;
    a POS system scanner connector supported by the interceptor housing and physically and communicatively connectable to the POS system scanner by a first hardwire connectable to the POS system scanner and the POS system scanner connector such that the POS lottery ticket data interceptor is connected to the POS system scanner in place of the POS system terminal and all scan data generated by the POS system scanner is communicated from the POS system scanner by the first hardwire and the POS system scanner connector to the POS lottery ticket data interceptor;
    a terminal connector supported by the interceptor housing and physically and communicatively connectable to the POS system terminal by a second hardwire connectable to the terminal connector and the POS system terminal such that the POS lottery ticket data interceptor is connected to the POS system terminal in place of the POS system scanner;
    a data transmitter supported by the interceptor housing;
    a data receiver supported by the interceptor housing;
    a processor supported by the interceptor housing and communicatively connected to the POS system scanner connector, the terminal connector, the data transmitter, and the data receiver; and
    a memory device supported by the interceptor housing;
    wherein the memory device stores a plurality of instructions that when executed by the processor, cause the POS lottery ticket data interceptor to:
        monitor all scan data received from the POS system scanner via the first hardwire based on all scans by the POS system scanner;
        responsive to receiving scan data from the POS system scanner that comprises lottery ticket related data that is related to a lottery ticket and that is different from UPC data related to the lottery ticket, determine and transmit other data different from the scan data to the POS system terminal via the second hardwire, the other data related to the lottery ticket; and
        responsive to receiving scan data from the POS system scanner that does not comprise any lottery ticket related data, transmit the scan data without modification to the POS system terminal.

2. The POS lottery ticket data interceptor of claim 1, which includes a printer connector supported by the interceptor housing, the printer connector communicatively connected to the processor and communicatively connectable to a lottery ticket printer.

3. The POS lottery ticket data interceptor of claim 1, wherein the plurality of instructions, when executed by the processor, cause the POS lottery ticket data interceptor to:

responsive to receiving scan data from the POS system scanner wherein the scan data comprises the lottery ticket related data related to an instant lottery ticket, create in real time ticket activation request data, and transmit the ticket activation request data to a lottery central system.

4. The POS lottery ticket data interceptor of claim 3, wherein lottery ticket related data comprises I2of5 content.

5. The POS lottery ticket data interceptor of claim 3, wherein the plurality of instructions, when executed by the processor, cause the POS lottery ticket data interceptor to, responsive to receiving from the lottery central system ticket activation response data comprising a ticket activation confirmation, determine UPC data associated with the instant lottery ticket, and create and transmit the UPC data for the instant lottery ticket to the POS system terminal as part of the other data.

6. The POS lottery ticket data interceptor of claim 5, wherein the UPC data enables the POS system terminal to add a lottery sale to a POS shopping cart.

7. The POS lottery ticket data interceptor of claim 1, wherein the plurality of instructions, when executed by the processor, cause the POS lottery ticket data interceptor to:
responsive to receiving scan data from the POS system scanner wherein the scan data comprises lottery ticket related data related to a draw lottery ticket, create in real time draw game wager request data and transmit the draw game wager request data to a lottery central system.

8. The POS lottery ticket data interceptor of claim 7, wherein the lottery ticket related data related to the draw lottery ticket comprises a UPC barcode for the draw lottery ticket.

9. The POS lottery ticket data interceptor of claim 7, wherein the plurality of instructions, when executed by the processor, cause the POS lottery ticket data interceptor to, responsive to receiving from the lottery central system ticket draw game wager response data comprising a wager confirmation, transmit UPC data for the draw lottery ticket to the POS system terminal.

10. The POS lottery ticket data interceptor of claim 9, wherein the plurality of instructions, when executed by the processor, cause the POS lottery ticket data interceptor to, responsive to receiving from the lottery central system ticket draw game wager response data comprising a wager confirmation, cause a lottery system printer to print the draw lottery ticket.

11. The POS lottery ticket data interceptor of claim 9, wherein the UPC data enables the POS system terminal to add a lottery sale to a POS shopping cart.

12. The POS lottery ticket data interceptor of claim 1, wherein the plurality of instructions, when executed by the processor, cause the POS lottery ticket data interceptor to:
responsive to receiving scan data from the POS system scanner wherein the scan data comprises lottery ticket related data related to a lottery ticket redemption, create in real time ticket redemption request data, and transmit the ticket redemption request data to a lottery central system.

13. The POS lottery ticket data interceptor of claim 12, wherein the lottery ticket is one of an instant lottery ticket and a draw lottery ticket.

14. The POS lottery ticket data interceptor of claim 12, wherein the plurality of instructions, when executed by the processor, cause the POS lottery ticket data interceptor to, responsive to receiving from the lottery central system ticket redemption response data, create and transmit UPC data for the lottery ticket to the POS system terminal as the other data.

15. The POS lottery ticket data interceptor of claim 14, wherein the UPC data for the lottery ticket enables the POS system terminal to add a payment amount to a POS shopping cart.

16. The POS lottery ticket data interceptor of claim 14, wherein the ticket redemption response data comprises data relating to the lottery ticket and corresponding to one of: a no-win category, a low-tier win amount category, a mid-tier win amount category, and a high-tier win amount category.

17. The POS lottery ticket data interceptor of claim 16, wherein the UPC data for the lottery ticket corresponds to the low tier win amount category and enables the POS system terminal to add a payment amount to a POS shopping cart.

18. A point-of-sale (POS) lottery ticket data interceptor communicatively and operably connectable to a POS system comprising a scanner that comprises a scanner housing and a POS system terminal that comprises a terminal housing, the POS lottery ticket data interceptor comprising:
an interceptor housing that is separate from the scanner housing and the terminal housing;
a scanner connector supported by the interceptor housing and physically connectable to the scanner by a first hardwire connectable to the scanner and the scanner connector such that all scan data generated by the scanner is communicated from the scanner by the first hardwire and the scanner connector to the POS lottery ticket data interceptor;
a terminal connector supported by the interceptor housing and physically connectable to the POS system terminal by a second hardwire connectable to the terminal connector and the POS system terminal;
a data transmitter supported by the interceptor housing;
a data receiver supported by the interceptor housing;
a processor supported by the interceptor housing and communicatively connected to the scanner connector, the terminal connector, the data transmitter, and the data receiver; and
a memory device supported by the interceptor housing, wherein the memory device stores a plurality of instructions that when executed by the processor, cause the POS lottery ticket data interceptor to:
analyze all scan data received from the scanner based on all scans by the scanner;
responsive to the scan data being lottery ticket related data related to a lottery ticket, transmit data based on the lottery ticket related data to a lottery central system, receive lottery ticket data from the lottery central system, and transmit data to the POS system terminal to facilitate purchase of the lottery ticket; and
responsive to the scan data not comprising lottery ticket related data, transmit the scan data without modification to the POS system terminal.

19. A point-of-sale (POS) lottery ticket data interceptor communicatively and operably connectable to a POS system comprising a scanner that comprises a scanner housing and a POS system terminal that comprises a terminal housing, the POS lottery ticket data interceptor comprising:
an interceptor housing that is separate from the scanner housing and the terminal housing;
a scanner connector supported by the interceptor housing and physically connectable to the scanner by a first hardwire connectable to the scanner and the scanner connector such that all scan data generated by the scanner is communicated from the scanner by the first hardwire and the scanner connector to the POS lottery ticket data interceptor;

a terminal connector supported by the interceptor housing and physically connectable to the POS system terminal by a second hardwire connectable to the terminal connector and the POS system terminal;

a data transmitter supported by the interceptor housing;

a data receiver supported by the interceptor housing;

a processor supported by the interceptor housing and communicatively connected to the scanner connector, the terminal connector, the data transmitter, and the data receiver; and a memory device supported by the interceptor housing, wherein the memory device stores a plurality of instructions that when executed by the processor, cause the POS lottery ticket data interceptor to:

analyze all scan data received from the scanner based on all scans by the POS system scanner;

responsive to the scan data being lottery ticket related data related to a lottery ticket, transmit data based on the lottery ticket related data to a lottery central system, receive lottery ticket data from the lottery central system, and transmit data to the POS system terminal to facilitate redemption of the lottery ticket; and responsive to the scan data not comprising lottery ticket related data, transmit the scan data without modification to the POS system terminal.

* * * * *